United States Patent
Rao

(10) Patent No.: US 9,720,416 B1
(45) Date of Patent: Aug. 1, 2017

(54) VEHICLE SECURITY SYSTEM

(71) Applicant: Ford Global Technologies, LLC, Dearborn, MI (US)

(72) Inventor: Manoharprasad K. Rao, Novi, MI (US)

(73) Assignee: Ford Global Technologies, LLC, Dearborn, IL (US)

( * ) Notice: Subject to any disclaimer, the term of this patent is extended or adjusted under 35 U.S.C. 154(b) by 0 days.

(21) Appl. No.: 15/131,109

(22) Filed: Apr. 18, 2016

(51) Int. Cl.
*G05D 1/02* (2006.01)
*G05D 1/00* (2006.01)
*G01C 21/34* (2006.01)
*B60W 30/18* (2012.01)
*B60N 2/00* (2006.01)
*G01S 19/42* (2010.01)

(52) U.S. Cl.
CPC ........... *G05D 1/0214* (2013.01); *B60N 2/002* (2013.01); *B60W 30/18* (2013.01); *G01C 21/34* (2013.01); *G01S 19/42* (2013.01); *G05D 1/0088* (2013.01)

(58) Field of Classification Search
CPC .... G05D 1/0214; G05D 1/0088; G01C 21/34; B60W 30/18; G01S 19/42; G08B 21/22; G08B 21/24; B60N 2/002
See application file for complete search history.

(56) References Cited

U.S. PATENT DOCUMENTS

| | | | |
|---|---|---|---|
| 4,637,359 A * | 1/1987 | Cook | F02N 11/0807 123/179.3 |
| 7,106,203 B2 | 9/2006 | Edwards et al. | |
| 7,176,801 B2 | 2/2007 | Matsukawa et al. | |
| 7,408,445 B1 * | 8/2008 | Cunningham | B60Q 9/00 180/271 |
| 8,643,507 B2 | 2/2014 | Rodriguez et al. | |
| 8,948,442 B2 * | 2/2015 | Breed | B60R 1/00 382/100 |
| 2004/0160320 A1 * | 8/2004 | Edwards | B60N 2/002 340/539.21 |
| 2010/0222976 A1 * | 9/2010 | Haug | B60K 28/04 701/70 |
| 2010/0277345 A1 * | 11/2010 | Rodriguez | G01T 1/167 340/945 |
| 2011/0074565 A1 * | 3/2011 | Cuddihy | B60N 2/002 340/457 |

(Continued)

FOREIGN PATENT DOCUMENTS

| | | |
|---|---|---|
| CN | 101937609 A | 1/2011 |
| CN | 103310597 A | 9/2013 |

(Continued)

OTHER PUBLICATIONS

Avrahami, Daniel, et al., "The Danger of Loose Objects in the Car: Challenges and Opportunities for Ubiquitous Computing," University of California Irvine, UbiComp'11, Sep. 17-21, 2011, Beijing, China.

*Primary Examiner* — Courtney Heinle
(74) *Attorney, Agent, or Firm* — Frank MacKenzie; Bejin Bieneman PLC

(57) ABSTRACT

A determination is made that a vehicle is unoccupied. Detecting of at least one of an unexpected object in the vehicle and an intrusion into a vehicle compartment is performed. A route to a location is selected according to detected object and/or intrusion. The vehicle is navigated to the location.

18 Claims, 3 Drawing Sheets

(56) References Cited

U.S. PATENT DOCUMENTS

| | | | |
|---|---|---|---|
| 2012/0050021 A1* | 3/2012 | Rao | B60N 2/002 340/425.5 |
| 2013/0109342 A1* | 5/2013 | Welch | B60N 2/002 455/404.2 |
| 2014/0011482 A1* | 1/2014 | Le | G08B 19/00 455/414.1 |
| 2014/0277935 A1* | 9/2014 | Daman | G08G 1/127 701/36 |
| 2014/0340520 A1* | 11/2014 | Hay | G01J 3/0264 348/148 |
| 2014/0358353 A1* | 12/2014 | Ibanez-Guzman | G05D 1/0027 701/23 |
| 2015/0051778 A1* | 2/2015 | Mueller | B60W 50/029 701/23 |
| 2015/0061856 A1* | 3/2015 | Raman | G08B 21/24 340/457 |
| 2015/0066284 A1* | 3/2015 | Yopp | B60W 30/00 701/29.2 |
| 2015/0137985 A1* | 5/2015 | Zafiroglu | B60R 16/02 340/686.1 |
| 2015/0175070 A1* | 6/2015 | Attard | B60R 1/00 340/439 |
| 2015/0286882 A1* | 10/2015 | Nicol | G06K 9/00838 348/148 |
| 2015/0336502 A1* | 11/2015 | Hillis | B60Q 1/26 701/23 |
| 2015/0339928 A1* | 11/2015 | Ramanujam | G05D 1/0212 701/23 |
| 2015/0346718 A1* | 12/2015 | Stenneth | G06Q 30/0611 701/2 |
| 2015/0356665 A1* | 12/2015 | Colson | G06Q 30/0635 705/26.81 |
| 2016/0019775 A1* | 1/2016 | Fokkelman | G06Q 10/083 340/539.32 |
| 2016/0049061 A1* | 2/2016 | Scarborough | B60N 2/002 340/449 |
| 2016/0116913 A1* | 4/2016 | Niles | G01N 1/2273 701/23 |
| 2016/0161266 A1* | 6/2016 | Crawford | G01C 21/34 701/25 |
| 2016/0195613 A1* | 7/2016 | Knox | G01S 13/867 342/52 |
| 2016/0332535 A1 | 11/2016 | Bradley et al. | |

FOREIGN PATENT DOCUMENTS

| | | |
|---|---|---|
| CN | 104118355 B | 1/2016 |
| WO | 2015025435 A1 | 2/2015 |

* cited by examiner

VEHICLE SECURITY SYSTEM

BACKGROUND

Users can leave items in a shared vehicle upon leaving the vehicle. The shared vehicle may not be returned after each use to a service station for an inspection or cleaning during which such items could be found. Thus, a user may not be able to retrieve a lost item before another user has access to the vehicle. Further, there is a risk of a user leaving, perhaps even deliberately, a dangerous object in the vehicle, e.g., a weapon, a chemical, an explosive material hidden in a bag, etc.

DETAILED DESCRIPTION

Figure 1:
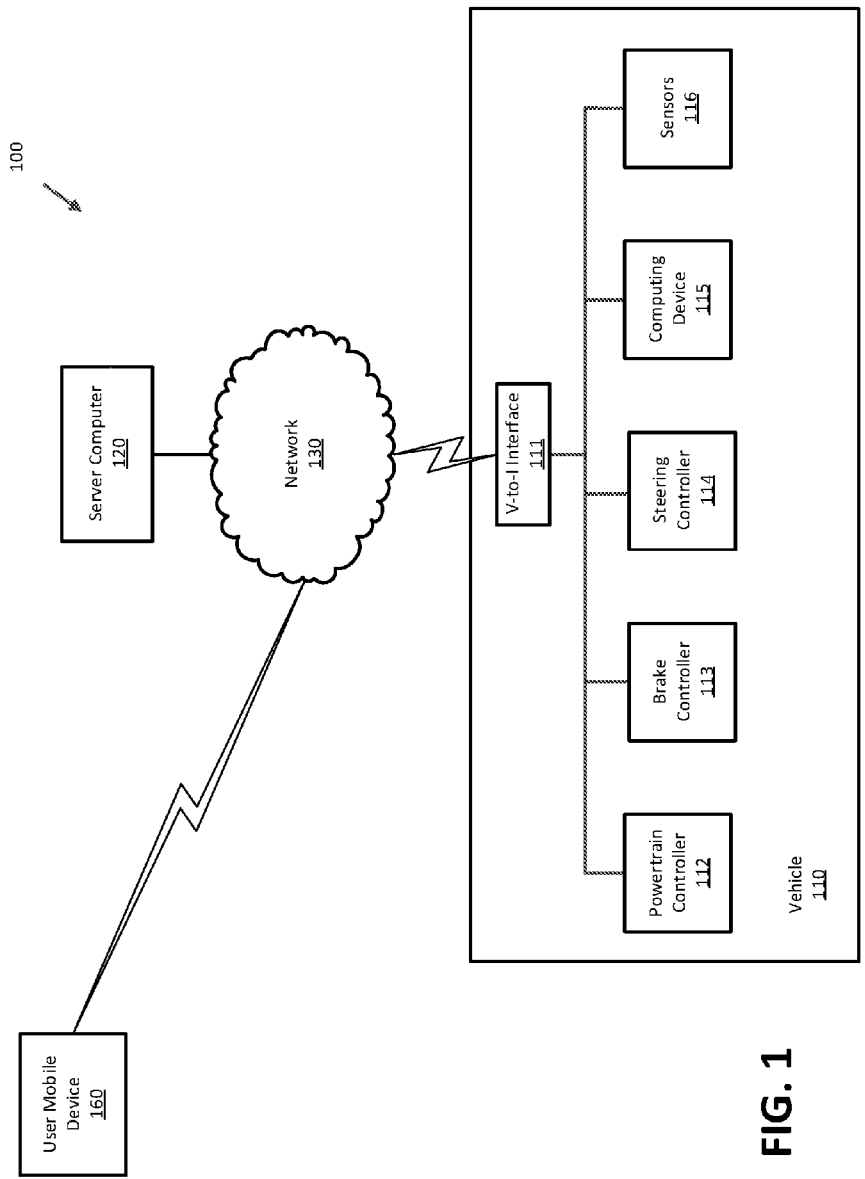
FIG. 1 is a block diagram of an exemplary system for detecting an object in a vehicle.

FIG. 1 illustrates an exemplary vehicle system 100. A vehicle 110 may include a computing device 115, and sensors 116 having a detection field (not shown) encompassing at least some of a vehicle interior. The computing device 115 can receive data from the sensors 116. Further, the computing device 115 can include programming, e.g., as a set of instructions stored in a memory of, and executable by, a processor of the computing device 115, for operations described herein, e.g., to detect an object in a vehicle and cause actuation of one or more vehicle components based on such determination. In particular, the computing device 115 can be programmed to determine that the vehicle is unoccupied, that an unexpected object is present in the vehicle, for example by evaluating the sensor data received from the sensors 116, calculate a route to a location that is selected according to the unexpected object, and navigate the vehicle to the location.

Exemplary System Elements

The vehicle 110 is typically a land vehicle with at least three wheels. The vehicle 110 may be powered in variety of known ways, e.g., with an electric motor and/or internal combustion engine. The vehicle 110 includes the computing device 115, sensors 116, and other elements discussed herein below.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH®, wired and/or wireless packet networks, etc.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location, intersection (without signal) minimum time-to-arrival to cross the intersection, etc.

Controllers, as that term is used herein, are computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide a geographical coordinates of the vehicle 110. The distance provided by the radar or the geographical coordinates provided by the GPS sensor may be used by the computing device 115 to operate the vehicle 110 autonomously or semi-autonomously.

As described further below with respect to the process 200 illustrated in FIG. 2, the computing device 115 can evaluate the sensor data received from the sensors 116 to detect a status of vehicle occupancy, i.e., whether the vehicle 110 is occupied by occupant human user. For example, the vehicle 110 may have one or more seats, and the sensors 116 may include weight sensors disposed inside the seats to detect an occupant on the seat. The computing device 115 may receive the status of vehicle occupancy from a suitable interface such as is known. As discussed further below, various types of sensors 116 could be used to detect the status of vehicle occupancy.

For example, the sensors 116 may include one or more cameras disposed in the vehicle 110 providing optical image data encompassing at least some of the vehicle interior. The optical image data may be received by the computing device 115 through a suitable interface such as in known.

Further, the sensors 116 may include microphones disposed in the vehicle, e.g., the interior or a trunk, providing audio data. The audio data may be received by the computing device 115 through a suitable interface, e.g., an analog-to-digital converter.

Additionally or alternatively, the sensors 116 may include one or more thermal cameras disposed in the vehicle 110, providing thermal data from the vehicle interior. The thermal data may be received by the computing device 115 through an analog or digital interface or any other interface. Thermal data may be used to generate a map or an image, wherein warmer portions of a region in the detection field of the thermal camera may be represented with a color that contrasts with cooler regions. This may provide for distinguishing between the vehicle interior 110 and occupants in the vehicle due to the different temperature of human body compared to the vehicle interior.

Additionally or alternatively, the sensors 116 may include one or more infrared sensors providing infrared data from the vehicle interior. The infrared sensors may further include excitation sources and infrared receivers. The excitation sources may illuminate the vehicle interior with infrared radiation. A reflection of the infrared illumination may be captured by the infrared sensor as an infrared data. The infrared data may be received by the computing device 115 through a suitable interface such as is known.

Further, the sensors 116 may include one or more radio frequency receiving elements to detect a short range data link from a controller in the vehicle to an external device like a key fob in communication with the computing device 115 in the vehicle. For example, an active communication from a vehicle key to an immobilizing controller of the vehicle or a BLUETOOTH® connection to a user mobile device 160 may be interpreted as occupancy of the vehicle, i.e., a driver of the vehicle may be in the vehicle 110 or may be in proximity to, e.g., within a predetermined distance of, the vehicle 110.

The sensors 116 may further include a GPS module such as is known included in the vehicle 110 and/or the user mobile device 160. The computing device 115 may receive the current location of the user mobile device 160 detected by the GPS sensor included in the user GPS-equipped mobile device 160 through a mobile communication network communicating with the V-to-I interface 111. A GPS coordinate in proximity of the vehicle 110 reported by the user mobile device 160 may be considered as an indication for occupancy of the vehicle 110.

Processes

Figure 2:
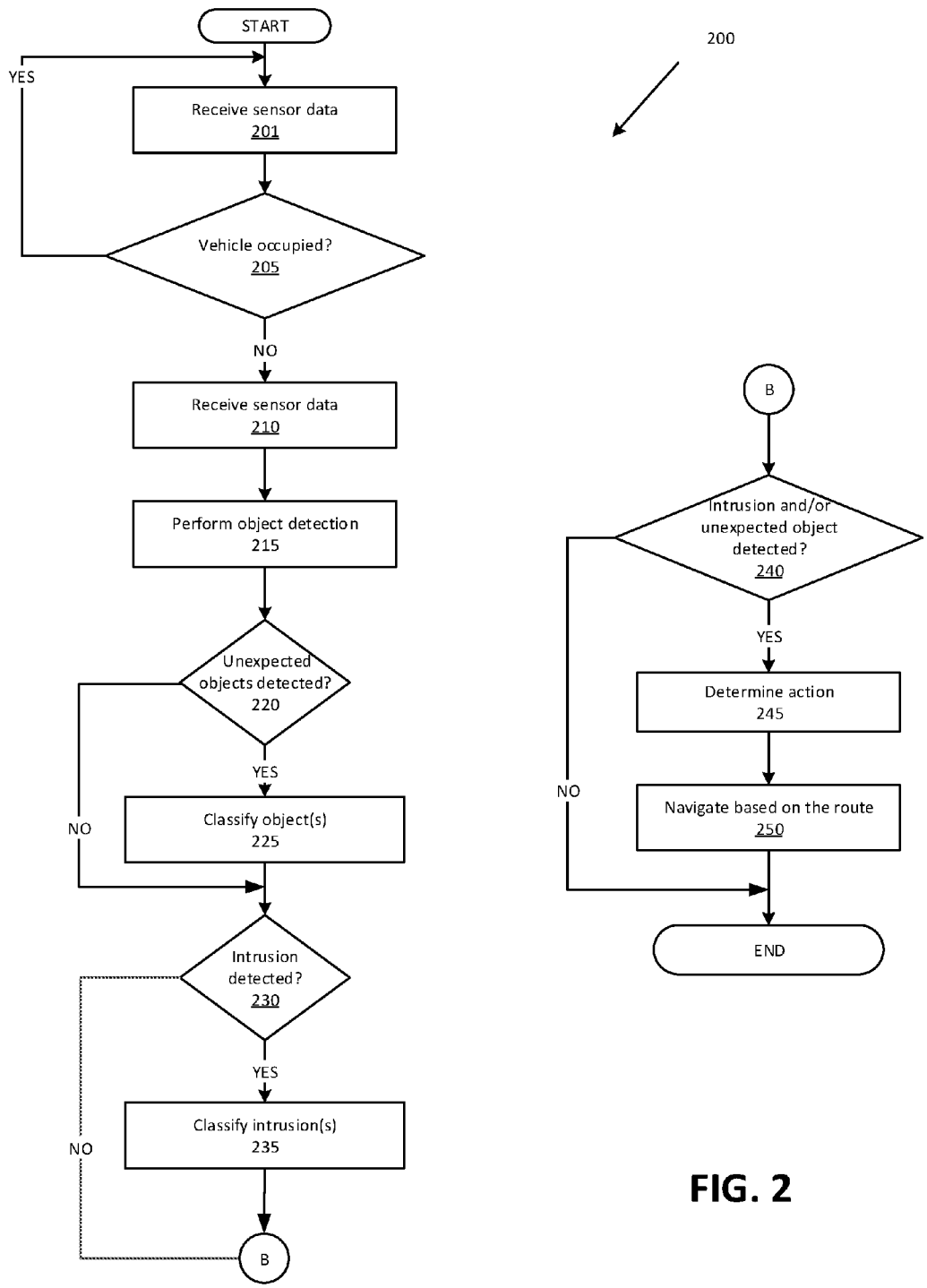
FIG. 2 is a flowchart of an exemplary process for detecting of an object in a vehicle and performing actions.

FIG. 2 illustrates an example process 200 for determining whether an unexpected object is in a vehicle 110 when the vehicle 110 is unoccupied by a user. In the present context, a detected object is "unexpected" when the computing device 115 determines that the object should not be in the vehicle 110 at a time when the object is detected. For example, the computing device 115 could include in its memory a list of objects that could be detected in the vehicle 110 when the vehicle 110 is unoccupied and/or could be programmed to expect no object to be detected at one or more locations in the vehicle 110 when the vehicle is unoccupied.

The process 200 begins in a block 201, in which the computing device 115 receives sensor 116 data. As discussed above, such data may include one or more of audio data, infrared, thermal, and/or or visual (i.e., camera) image data, etc.

Next, in a block 205, the computing device 115 determines whether the vehicle is unoccupied. Such determination, as stated above, may include processing optical, infrared, thermal, audio, ultra sound, and/or other sensor data received in the block 201. Additionally or alternatively, determining vehicle occupancy 205 may include receiving location data of a user mobile device 160. If a location of the device 160 is more than a predetermined distance, e.g. five meters, from the vehicle 110, it may be determined that the vehicle 110 is unoccupied by the user.

If the vehicle 110 is determined to be occupied, then the process 200 returns to the block 201. If the 110 vehicle is determined to be unoccupied, then the process 200 proceeds to a block 210. It is possible that the computing device 115 could execute steps such as described below to detect an object in the vehicle 110 when the vehicle 110 is occupied by a user.

In the block 210, the computing device 115 collects sensor 116 data in the block 210, e.g., data from sensors 116 such as cameras, weight sensors, microphones, etc. In one example, the sensor 116 data collected in the block 210 may include different data compared to the sensor 116 data collected at the block 201, e.g., a sensor 116 may use signals which may be harmful for humans and can be activated only after the vehicle 110 is determined to be unoccupied.

Next, in a block 215, the computing device 115 determined whether an unexpected object is detected. The computing device 115 may use known techniques for object detection, e.g., the block 215 may include using image comparison techniques for comparing received image data to reference images, i.e., a current image data of the vehicle interior or trunk of the vehicle can be compared to one or more reference images previously captured and stored in the memory of the computing device 115. A reference image typically shows a portion of the vehicle 110 interior without any unexpected objects, and unoccupied. Differences determined through comparing the current image data to the reference image may indicate a presence of an unexpected object. Additionally or alternatively, the thermal image data can be used and compared to a reference thermal image data. Use of thermal image data may be useful in detecting specific objects like explosive material.

Yet further additionally or alternatively, object detection in the block 215 may include analyzing audio data received from sensors 116 utilizing signal processing algorithms, e.g., a sound of a mechanically constructed timer may indicate a presence of a detonation mechanism.

Further for example, performing object detection in the block 215 could include combining results of the object detection based on two or more types of sensor 116 data. For example, the computing device 115 could compare a prediction of an expected object as determined by three types of sensor data, e.g., infrared image, camera image, and audio data, and predict the presence of an unexpected object only if two or more sensor 116 data types provided an indication of an unexpected object. This or other data fusion techniques may reduce a likelihood of false detections, and improve a confidence in detecting the unexpected object, e.g., combining the results of object detection from the audio data and the image data may help to better identify the object or avoid a false detection.

In a block 220, the computing device 115 determined whether an unexpected object was detected in the block 215. If so, the computing device 115 proceeds to a block 225 to classify the unexpected object. Otherwise, the process 200 proceeds to a block 230.

In the block 225, the computing device 115 uses image recognition techniques or the like to classify the one or more detected unexpected objects. For example, classifications could include "no danger," "moderate risk," "high risk," etc. The computing device 115 could store reference images of objects in a "no danger" category, e.g., fast food wrappers, beverage cups, etc. The computing device 115 could further store reference images of objects in other categories. If the computing device 115 is unable to identify an object for classification, a default could be to a medium or high risk category. Further in the block 225, the computing device 115 may transmit a message to the server computer 120 indicating the detection of the unexpected object, possibly also including its classification. In some implementation the block 225 could be omitted, and any detected unexpected object could be assumed to present a single level of risk warranting action as described below and/or the server 120 could simply be notified of an unexpected object.

In a block 230, which can follow either of the blocks 220, 225, the computing device 115 determines whether a user has attempted to access a restricted area of the vehicle 110. Access to some areas of the vehicle 110 may be restricted to reduce a complexity of detecting objects in the vehicle, e.g., prohibiting access to a glove box, engine compartment, or other compartment. In such a configuration, no additional sensors for detecting objects in those restricted areas may be needed. However, the user may intentionally try to gain access to those restricted areas in order to place an unexpected object. The sensors 116 may therefore include sensors for detecting intrusion to those restricted areas. As shown in block 230, an intrusion to such restricted areas may be detected using the sensor 116 data. If an intrusion to restricted area is detected, then a block 235 is executed next. Otherwise, the process 200 proceeds to a block 240.

In the block 235 a detected intrusion is classified. An intrusion classification may be according to categories such as described above concerning unexpected objects and according to characteristics of a restricted area, e.g., the size of the restricted area, i.e., a more dangerous object may be disposed in a larger restricted area. In some implementations the block 235 could be omitted, and any detected intrusion could be assumed to present a single level of risk warranting action as described below.

In the block 240, the computing device 115 determines whether at least one of an unexpected object and/or an intrusion into a restricted area has been detected. If not, the process 200 ends. However, if an unexpected object and/or intrusion has been detected, then the process 200 continues in the block 245 to take one or more actions to address the unexpected object and/or intrusion.

Next, in a block 245, the computing device 115 determines one or more actions for the vehicle 110 based on the detected unexpected object(s) and/or intrusion(s). For example, the action could be to plan and navigate a route to a service center or the like, where the vehicle could be inspected. Alternatively, the action could be to drive the vehicle to a safe location, e.g., a location at which emergency or service personnel can inspect the vehicle 110, at which the vehicle 110 may pose less of a risk to surrounding people and/or other vehicles, buildings, etc. The action could be based on a classification of the object and/or intrusion, performed as described above. For example, a classification of a highest degree of danger or risk could mean that the computing device 115 will cause the vehicle to navigate to the nearest location that can be identified at which the vehicle 110 will pose the least risk to surroundings. On the other hand, classifications of a low or medium risk could mean that the computing device 115 will plan and cause to be carried out a route to a service center or the like at which the vehicle 110 can be inspected. A process 300 is described below with respect to FIG. 3 for planning and implementing such a route. Further alternatively or additionally, e.g., in instances where a highest degree of risk is indicated, the computing device 115 could determine to provide warnings, e.g., by flashing vehicle lights, sounding a vehicle horn, and/or providing a message to the server 120, etc.

Next, in a block 250, the computing device 115 implements an action determined in the block 245. For example, the computing device 115 could cause vehicle lights to flash, a horn to sound, send a message to the server 120, etc. Further, the computing device 115 could instruct various ECUs to control the vehicle 110 to navigate on a planned route. That is, the vehicle 110 may be navigated autonomously according to the route determined at block 245. The computing device 115 may communicate with the sensors 116, powertrain controller 112, steering controller 114, and brake controller 113 to accelerate, steer, and stop the vehicle on the determined route from the current location to the safe location. Alternatively or additionally, the server computer 120 may communicate to the computing system 115 and apply a change to the destination, i.e., the determined safe location and/or the determined routing restriction.

Following the block 250, the process 200 ends.

Figure 3:
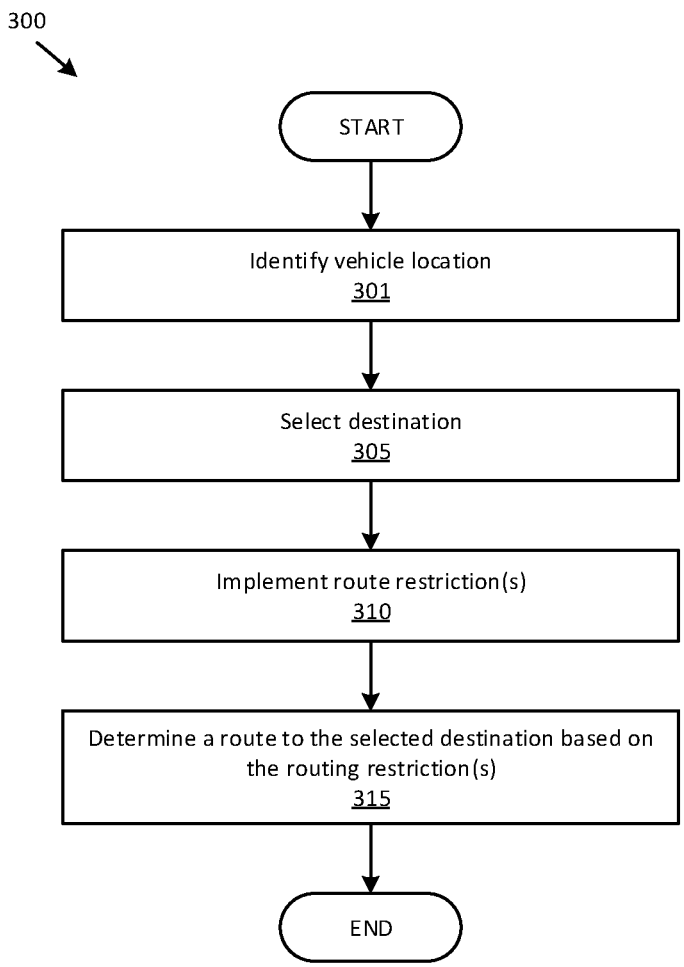
FIG. 3 is a flowchart of an exemplary process for vehicle routing restrictions when an unexpected object is detected in a vehicle.

FIG. 3 illustrates the details of an exemplary process 300 for determining a vehicle 110 route, e.g., as mentioned above concerning the block 245 of the process 200.

The process 300 begins in a block 301, in which the computing device 115 identifies, e.g., according to a GPS sensor 116 in the vehicle 110, a vehicle 110 location, e.g., geo-coordinates (e.g., latitude and longitude) such as are known of the vehicle 110.

Next, in a block 305, a vehicle 110 destination is selected, possibly based at least in part on one or more respective classifications of an unexpected object and/or intrusion. For example, detecting an unexpected object and/or intrusion of a highest degree of risk, or detected both an unexpected object and an intrusion, then, a destination could be selected to reflect the high degree of risk, e.g., the destination could be a closest safe location. The computing device 115 memory could thus store a list of predetermined safe locations and select the location from the list according to a predetermined rule, e.g., the nearest safe location to the current or parking location of the vehicle, a safe location unlikely to be surrounded by other vehicles or people, or at least having less dense surroundings, etc. Alternatively, the computing device 115 could send a request to the server computer 120 with information about the current location of the vehicle 110, the above classification(s), etc. The server computer 120 then responds to the request by providing a route destination, i.e., a recommended safe location.

Next, in a block 310, the computing device 115 can account for the fact that moving the vehicle 110 to the destination selected in the block 305 may impose a risk to areas along the planned route. Therefore, in the block 310 the computing device 115 may place one or more restrictions on the planned route, e.g., using geo-fencing or the like. For example, a restriction could impose a minimum distance from the vehicle 110 to schools or shopping malls. In other words, a route restriction could be that the vehicle 110 shall never be nearer to a school or a shopping mall than a minimum distance defined by a geo-fence. Alternatively or additionally, other routing restrictions may be imposed, e.g., a speed restriction.

At block 315, the computing device 115 may account for restriction that may be imposed above and based on a destination identified as stated above, determine a vehicle route from a current location of the vehicle 110 to the identified destination according to routing restrictions. The computing device 115 may use known routing algorithms. Additionally, the computing device 115 may inform the server computer 120 about the planned route.

Computing devices such as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in stored in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   determining that a vehicle is unoccupied;
   detecting at least one of an unexpected object in the vehicle and an intrusion into a vehicle compartment;
   classifying, according to a risk, the at least one of the unexpected object and the intrusion;
   determining a route to a location selected according to the at least one of the unexpected object and the intrusion; and
   navigating the vehicle to the location.

2. The method of claim 1, wherein the detecting includes at least one of receiving image data from an imaging system, receiving audio data from microphones, receiving seat occupancy status from seat occupancy sensors, detecting a short range data link to a mobile device, and receiving a GPS-location from a GPS-equipped mobile device.

3. The method of claim 2, wherein the image data is at least one of image, infrared, thermal, and ultra sound data.

4. The method of claim 1, wherein detecting the unexpected object in the vehicle includes at least one of comparing an image data to reference images, performing object detection on the image data, detecting the object based on an audio signal, and detecting an intrusion to a restricted area in the vehicle.

5. The method of claim 4, wherein the image data is at least one of an optical image, an infrared image, a thermal image, and an ultra sound image.

6. The method of claim 1, wherein determining the route to the location further includes selecting the location based in part on the classification.

7. The method of claim 1, wherein determining the route to the location further includes assigning a route restriction based on the classification.

8. The method of claim 7, wherein determining the route to the location is based on the route restriction.

9. The method of claim 1, further comprising transmitting a message indicating the detection.

10. A system, comprising a computing device in a vehicle, the computing device comprising a processor and a memory, the memory storing instructions executable by the processor, including instructions to:
   determine that the vehicle is unoccupied;
   detect at least one of an unexpected object in the vehicle and an intrusion into a vehicle compartment;
   classify, according to a risk, the at least one of the unexpected object and the intrusion;
   determine a route to a location selected according to the at least one of the unexpected object and the intrusion; and
   navigate the vehicle based on the route.

11. The system of claim 10, wherein the processor is further programmed to receive at least one of image data from an imaging system, audio data from microphones, seat occupancy status from seat occupancy sensors, status of detecting a short range data link to a mobile device, a GPS-location from a GPS-equipped mobile device.

12. The system of claim 11, wherein the image data is at least one of image, infrared, thermal, and ultra sound data.

13. The system of claim 10, wherein the processor is further programmed to at least one of compare an image data to reference images, perform object detection on the image data, detect the object based on an audio signal, and detect an intrusion into a restricted area in the vehicle.

14. The system of claim 13, wherein the image data is at least one of an optical image, an infrared image, a thermal image, and an ultra sound image.

15. The system of claim 10, wherein the process is further programmed to select the location based in part on the classification.

16. The system of claim 10, wherein the processor is further programmed to assign a route restriction based on the classification.

17. The system of claim 16, wherein determining the route to the location is based on the route restriction.

18. The system of claim 10, wherein the processor is further programmed to transmit a message indicating the detection.

* * * * *